United States Patent
Saha (10) Patent No.: US 12,426,041 B2
(45) Date of Patent: Sep. 23, 2025

(54) SYSTEM AND METHOD FOR SDAP / QoS BASED PROACTIVE SCHEDULING FOR UL TRANSMISSION

(71) Applicant: DISH Wireless L.L.C., Englewood, CO (US)

(72) Inventor: Sougata Saha, Aurora, CO (US)

(73) Assignee: DISH Wireless L.L.C., Englewood, CO (US)

( * ) Notice: Subject to any disclaimer, the term of this patent is extended or adjusted under 35 U.S.C. 154(b) by 355 days.

(21) Appl. No.: 18/297,498

(22) Filed: Apr. 7, 2023

(65) Prior Publication Data

US 2024/0340886 A1 Oct. 10, 2024

(51) Int. Cl.
*H04W 72/1268* (2023.01)
*H04W 72/566* (2023.01)

(52) U.S. Cl.
CPC ..... *H04W 72/1268* (2013.01); *H04W 72/566* (2023.01)

(58) Field of Classification Search
CPC ........... H04W 72/566; H04W 72/1268; H04W 72/121; H04W 72/1273; H04W 72/543; H04W 72/56
See application file for complete search history.

(56) References Cited

U.S. PATENT DOCUMENTS

2009/0168793 A1* 7/2009 Fox ............. H04L 47/6215
370/412
2019/0281587 A1* 9/2019 Zhang ............. H04W 72/23

OTHER PUBLICATIONS

"3rd Generation Partnership Project; Technical Specification Group Radio Access Network; NG-RAN; Architecture description (Release 16)," Technical Specification, 3GPP TS 38.401 V16.8.0, Dec. 2021, 79 pages.

* cited by examiner

*Primary Examiner* — Dinh Nguyen
(74) *Attorney, Agent, or Firm* — Seed Intellectual Property Law Group LLP (57) ABSTRACT

Systems and methods for Service Data Adaptation Protocol (SDAP) and Quality of Service (QOS) based proactive scheduling for UpLink (UL) transmission grants. One such method includes: determining, using a primary gNB that acts as a scheduler, which UEs are in an idle mode and which UEs are in a connected mode; mapping, using SDAP layers, the QoS flow to Data Radio Bearers (DRBs) from the primary gNB for UEs that are in the connected mode, wherein QoS flow packets are classified and marked using a QoS flow identifier (QFI); targeting, using the scheduler, UEs with a higher priority QFI for selection before UEs with a lower priority QFI; providing proactive grants of UL transmissions to the selected UEs with a higher priority QFI; and providing grants of UL transmissions to the UEs with a lower priority QFI using dynamic scheduling.

20 Claims, 8 Drawing Sheets

SYSTEM AND METHOD FOR SDAP / QoS BASED PROACTIVE SCHEDULING FOR UL TRANSMISSION

BACKGROUND

As the use of smartphones and Internet of Things (IoT) devices has increased, so too has the desire for more reliable, fast, and continuous transmission of content. In an effort to improve the content transmission, networks continue to improve with faster speeds and increased bandwidth. The advent and implementation of fifth-generation (5G) wireless technology has resulted in faster speeds and increased bandwidth. Thus, minimizing interruptions in the supporting networking infrastructure is important to providing a resilient and stable network with the desired end-to-end performance. It is with respect to these and other considerations that the embodiments described herein have been made.

BRIEF SUMMARY

The present disclosure relates generally to telecommunication networks, more particularly, to a Service Data Adaptation Protocol (SDAP) and Quality of Service (QOS) based proactive scheduling for UpLink (UL) transmission grants.

Briefly stated, one or more methods for SDAP and QoS based proactive scheduling for UL transmission grants are disclosed. Some such methods include: providing, by a mobile network operator, a distributed unit (DU) of a fifth-generation (5G) cellular telecommunication network radio access network (RAN) that is served by a particular 5G cellular site base station, wherein the DU: is associated with a primary 5G Node B (gNB) identified by a primary identifier (ID); and is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID; determining, using the primary gNB that acts as a scheduler, which User Devices (UEs) are in an idle mode and which UEs are in a connected mode; mapping, using SDAP layers, the QoS flow to Data Radio Bearers (DRBs) from the primary gNB for UEs that are in the connected mode, wherein QoS is enforced at the QoS flow level, and wherein QoS flow packets are classified and marked using a QoS flow identifier (QFI); targeting, using the scheduler, UEs with a higher priority QFI for selection before UEs with a lower priority QFI; providing proactive grants of UL transmissions to the selected UEs with a higher priority QFI; and providing grants of UL transmissions to the UEs with a lower priority QFI using dynamic scheduling, after the proactive grants of UL transmissions to the selected UEs with a higher priority QFI.

In some embodiments of the method for SDAP and QoS based proactive scheduling for UL transmission grants, the method further includes providing UL scheduling based on grant free UL transmission. In another aspect of some embodiments, the UL transmission grants are Radio Resource Control (RRC) based or Download Control Information (DCI) based. In still another aspect of some embodiments, the higher priority QFIs include QFI1, QFI2, and QFI3, while the lower priority QFIs include anything under QFI3, such as QFI4, QFI5, and QFI6. In yet another aspect of some embodiments, the method further includes preventing a shortage of PDCCH space before a shortage of PUSCH space. Further, in some embodiments, the method further includes preventing grants of UL transmissions to idle UEs with nothing to send. Moreover, in still other aspects of some embodiments, the method further includes minimizing grants of UL transmissions to connected UEs with a lower priority QFI.

In other embodiments, the present disclosure is directed towards a system for Service Data Adaptation Protocol (SDAP) and Quality of Service (QOS) based proactive scheduling for UpLink (UL) transmission grants. The system includes a memory that stores computer-executable instructions and a processor. The processor executes the computer-executable instructions and causes the processor to: determine, using the primary gNB that acts as a scheduler, which UEs are in an idle mode and which UEs are in a connected mode; map, using SDAP layers, the QoS flow to Data Radio Bearers (DRBs) from the primary gNB for UEs that are in the connected mode, wherein QoS is enforced at the QoS flow level, and wherein QoS flow packets are classified and marked using a QoS flow identifier (QFI); target, using the scheduler, UEs with a higher priority QFI for selection before UEs with a lower priority QFI; provide proactive grants of UL transmissions to the selected UEs with a higher priority QFI; and provide grants of UL transmissions to the UEs with a lower priority QFI using dynamic scheduling, after the proactive grants of UL transmissions to the selected UEs with a higher priority QFI.

In some embodiments of the system for SDAP and QoS based proactive scheduling for UL transmission grants, the system provides UL scheduling based on grant free UL transmission. In another aspect of some embodiments, the UL transmission grants are Radio Resource Control (RRC) based or Download Control Information (DCI) based. In still another aspect of some embodiments, the higher priority QFIs include QFI1, QFI2, and QFI3, while the lower priority QFIs include anything under QFI3, such as QFI4, QFI5, and QFI6. In yet another aspect of some embodiments, the system prevents a shortage of PDCCH space before a shortage of PUSCH space. Further, in some embodiments, the system prevents grants of UL transmissions to idle UEs with nothing to send. Moreover, in still other aspects of some embodiments, the system minimizes grants of UL transmissions to connected UEs with a lower priority QFI.

Additionally, in other embodiments, one or more non-transitory computer-readable storage mediums are disclosed. The one or more non-transitory computer-readable storage mediums have computer-executable instructions stored thereon that, when executed by a processor, cause the processor to: determine, using the primary gNB that acts as a scheduler, which UEs are in an idle mode and which UEs are in a connected mode; map, using SDAP layers, the QoS flow to Data Radio Bearers (DRBs) from the primary gNB for UEs that are in the connected mode, wherein QoS is enforced at the QoS flow level, and wherein QoS flow packets are classified and marked using a QoS flow identifier (QFI); target, using the scheduler, UEs with a higher priority QFI for selection before UEs with a lower priority QFI; provide proactive grants of UL transmissions to the selected UEs with a higher priority QFI; and provide grants of UL transmissions to the UEs with a lower priority QFI using dynamic scheduling, after the proactive grants of UL transmissions to the selected UEs with a higher priority QFI.

In some embodiments, the non-transitory computer-readable storage medium for SDAP and QoS based proactive scheduling for UL transmission grants, further includes providing UL scheduling based on grant free UL transmission. In another aspect of some embodiments, the UL transmission grants are Radio Resource Control (RRC) based or Download Control Information (DCI) based. In still another aspect of some embodiments, the higher priority QFIs include QFI1, QFI2, and QFI3, while the lower priority QFIs include anything under QFI3, such as QFI4, QFI5, and QFI6. In yet another aspect of some embodiments, the non-transitory computer-readable storage medium further includes preventing a shortage of PDCCH space before a shortage of PUSCH space. Also, in some embodiments, the non-transitory computer-readable storage medium further includes preventing grants of UL transmissions to idle UEs with nothing to send. Moreover, in still other aspects of some embodiments, the non-transitory computer-readable storage medium further includes minimizing grants of UL transmissions to connected UEs with a lower priority QFI.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the disclosed invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment." "in various embodiments," "in some embodiments." "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B. or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

5G architecture provides an environment in which the system for Service Data Adaptation Protocol (SDAP) and Quality of Service (QOS) based proactive scheduling for UpLink (UL) transmission grants may be implemented. The following paragraphs disclose some 5G concepts and elements that support the system for SDAP and QoS based proactive scheduling for UL transmission grants, which will be further described below with reference to FIG. 1-8.

Figure 1:
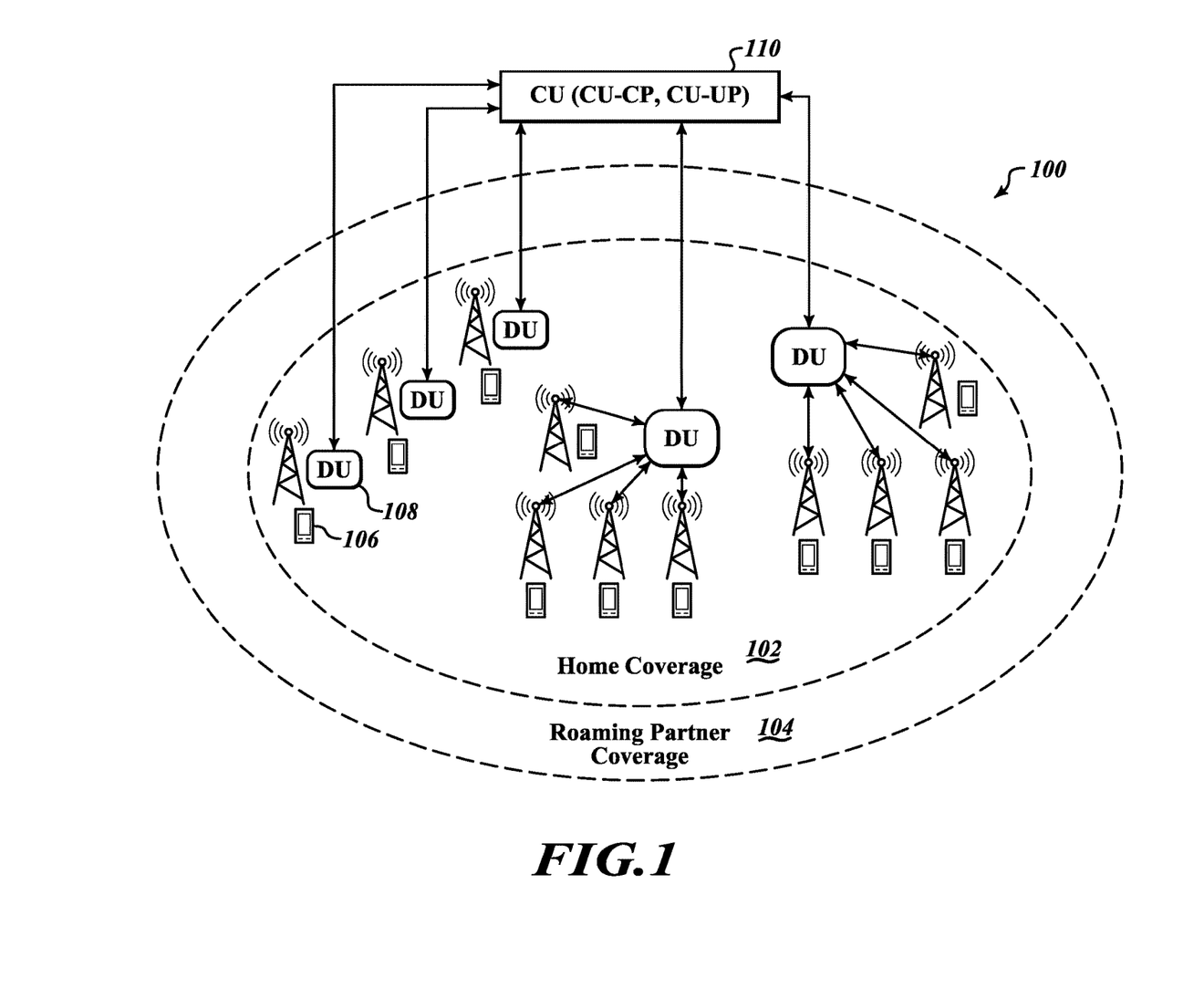
FIG. 1 illustrates a context diagram of Service Data Adaptation Protocol (SDAP) and Quality of Service (QOS) based proactive scheduling for UpLink (UL) transmission grants, which may be implemented in accordance with embodiments described herein.
Figure 2:
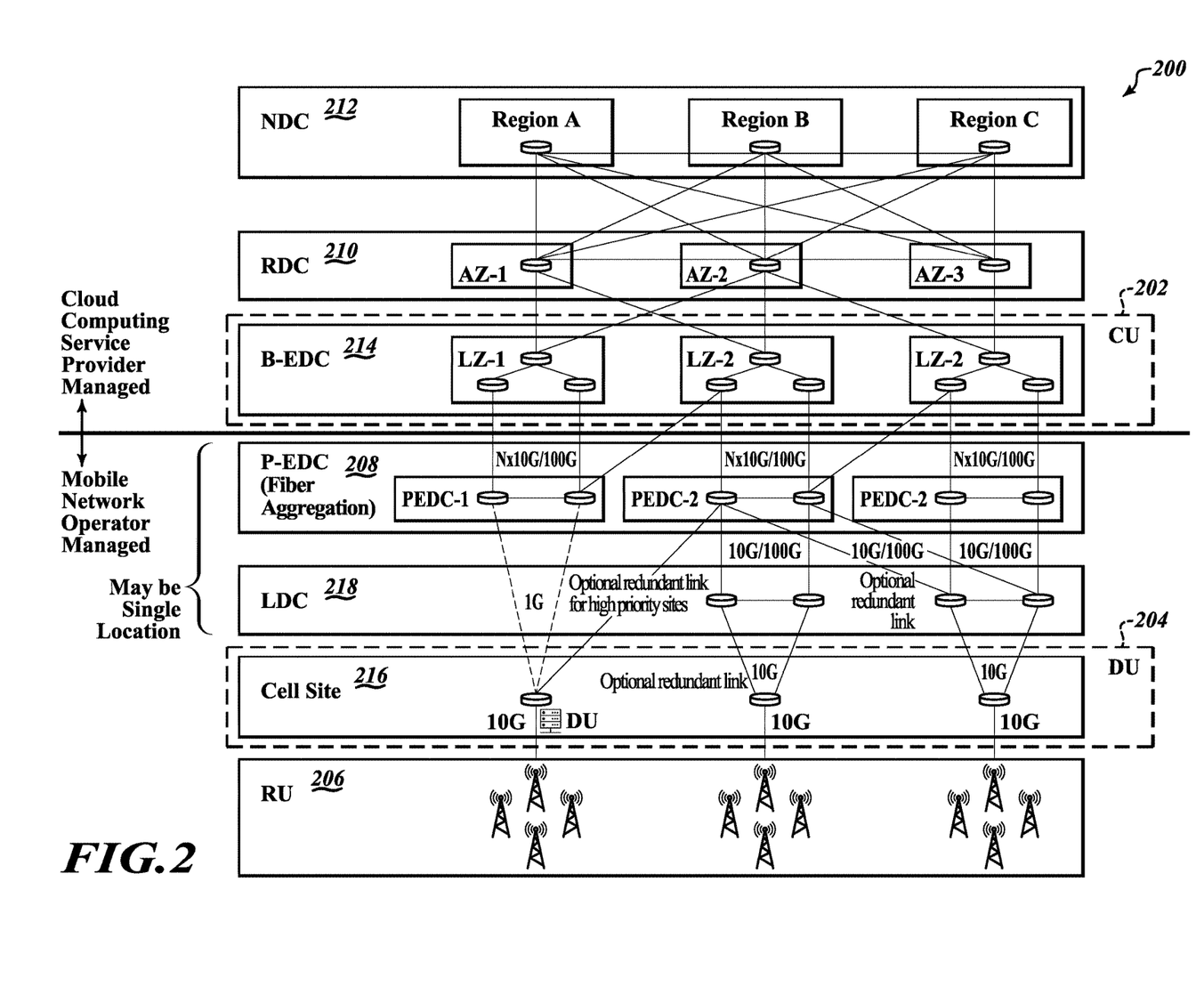
FIG. 2 illustrates a diagram of an example system architecture overview of a system in which the environment of FIG. 1, may be implemented in accordance with embodiments described herein.
Figure 3:
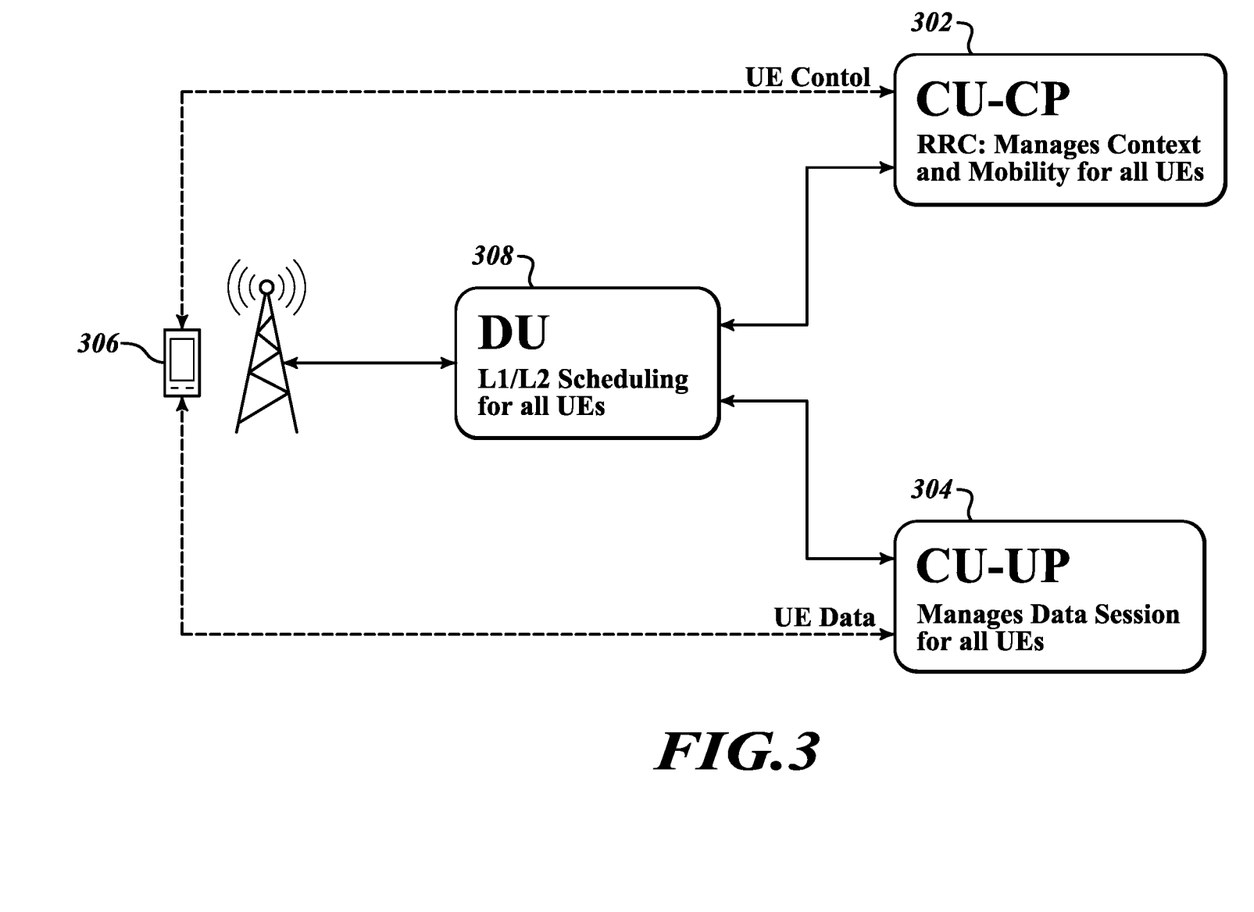
FIG. 3 illustrates a diagram showing connectivity between certain telecommunication network components during cellular telecommunication.

FIGS. 1-3 illustrate various aspects of a 5G environment that is described below with respect to the system for SDAP and QoS based proactive scheduling for UL transmission grants. For example, FIG. 1 illustrates a context diagram of connects between various towers, DUs (Distributed Units), CUs (Centralized Units), and UEs (User Devices). FIG. 2 illustrates a diagram of an example system architecture overview that includes an NDC (National Data Center), RDC (Regional Data Center), B-EDC (Breakout Edge Data Centers), P-EDC (Passthrough Edge Data Centers), LDC (Local Data Center), cell sites, and RUs (Radio Units). FIG. 3 illustrates a diagram showing UE controls for managing context and mobility for UEs and UE data for managing data session of UEs.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible, and virtual RAN with interfaces creating additional data access points.

5G network functions may be completely software-based and designed as cloud-native, meaning that they're agnostic to the underlying cloud infrastructure, allowing higher deployment agility and flexibility.

5G Core establishes reliable, secure connectivity to the network for end users and provides access to its services. 5G Core handles mobile network functions including connectivity, mobility management, authentication, subscriber data management, and policy management. 5G Core network functions are software-based and cloud-native, such that they may be used with various underlying cloud infrastructures.

With the advent of 5G, industry experts defined how the 5G Core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in telecommunications that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which leverages IT development principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open-source development, ultimately to case the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises a set of radio base stations (each known as Next Generation Node B (gNB)) connected to the 5G Core (5GC) and to each other. The gNB incorporates three main functional modules: the Centralized Unit (CU), the Distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called microservices.

A virtual private cloud (VPC) is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channels) per user. In some embodiments, this 5G network leverages the distributed nature of 5G cloud-native network functions and cloud flexibility, which optimizes the placement of 5G network functions for optimal performance based on latency, throughput and processing requirements.

In some embodiments, the network architecture utilizes a logical hierarchical architecture consisting of National Data Centers (NDCs), Regional Data Centers (RDCs) and Breakout Edge Data Centers (BEDCs), to accommodate the distributed nature of 5G functions and the varying requirements for service layer integration. In one or more embodiments, BEDCs are deployed in Local Zones hosting 5G NFs that have strict latency budgets. They may also be connected with Passthrough Edge Data Centers (PEDC), which serve as an aggregation point for all Local Data Centers (LDCs) and cell sites in a particular market. BEDCs also provide internet peering for 5G data service.

In one or more embodiments, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone. These combined pieces provide a full RAN solution that handles all radio level control and subscriber data traffic.

In some embodiments, the User Plane Function (Data Network Name (DNN)) is collocated in the BEDC, which anchors user data sessions and routes to the internet. In another aspect, the BEDCs leverage local internet access available in Local Zones, which allows for a better user experience while optimizing network traffic utilization.

In one or more embodiments, the Regional Data Centers (RDCs) are hosted in the Region across multiple availability zones. The RDCs host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, multiple RDCs are deployed in a region, each in a separate Availability Zone (AZ) to ensure application resiliency and high availability.

In another aspect of some embodiments, an AZ is one or more discrete data centers with redundant power, networking, and connectivity in a Region. In some embodiments, AZs in a Region are interconnected with high-bandwidth and low-latency networking over a fully redundant, dedicated metro fiber, which provides high-throughput, low-latency networking between AZs.

Cloud Native Functions (CNFs) deployed in the RDC utilize a high-speed backbone to failover between AZs for application resiliency. CNFs like AMF and SMF, which are deployed in RDC, continue to be accessible from the BEDC in the Local Zone in case of an AZ failure. They serve as the backup CNF in the neighboring AZ and would take over and service the requests from the BEDC.

In this embodiment of a system for SDAP and QoS based proactive scheduling for UL transmission grants, dedicated VPCs are implemented for each Data Center type (e.g., local data center, breakout edge data center, regional data center, national data center, and the like). In some such embodiments, the national data center VPC stretches across multiple Availability Zones (AZs). In another aspect of some embodiments, two or more AZs are implemented per region of the cloud computing service provider.

Some embodiments of the 5G Core network functions require support for advanced routing capabilities inside VPC and across VPCs (e.g., UPF, SMF and ePDG). These functions rely on routing protocols such as BGP for route exchange and fast failover (both stateful and stateless). To support these requirements, virtual routers are deployed on EC2 to provide connectivity within and across VPCs, as well as back to the on-prem network.

Referring again to FIG. 1, this figure illustrates a context diagram of an environment for a system for Service Data Adaptation Protocol (SDAP) and Quality of Service (QoS) based proactive scheduling for UpLink (UL) transmission grants, in accordance with embodiments described herein. A given area 100 will mostly be covered by two or more mobile network operators' wireless networks. Generally, mobile network operators have some roaming agreements that allow users to roam from home network to partner network under certain conditions, shown in FIG. 1 as home network coverage area 102 and roaming partner network coverage area 104. Operators may configure the mobile user's device, referred to herein as user equipment (UE), such as UE 106, with priority and a timer to stay on the home network coverage area 102 versus the roaming partner network coverage area 104. If a UE (e.g., UE 106) cannot find the home network coverage area 102, the UE will scan for a roaming network after a timer expiration (6 minutes, for example). This could have significant impact on customer experience in case of a catastrophic failure in the network. As shown in FIG. 1, a 5G RAN is split into DUs (e.g., DU 108) that manage scheduling of all the users and a CU that manages the mobility and radio resource control (RRC) state for all the UEs. The RRC is a layer within the 5G NR protocol stack. It exists only in the control plane, in the UE and in the gNB. The behavior and functions of RRC are governed by the current state of RRC. In 5G NR, RRC has three distinct states: RRC_IDLE, RRC_CONNECTED and RRC_INACTIVE FIG. 2 illustrates a diagram of an example system architecture overview 200 of a system for SDAP and QoS based proactive scheduling for UL transmission grants in which the environment of FIG. 1 may be implemented in accordance with embodiments described herein. As shown in FIG. 2, the radio unit (RU) 206 converts radio signals sent to and from the antenna into a digital signal for transmission over packet networks. It handles the digital front end (DFE) and the lower physical (PHY) layer, as well as the digital beamforming functionality.

The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNB functions, depending on the functional split option, and its operation is controlled by the CU 202.

The CU 202 is the centralized unit that runs the RRC and Packet Data Convergence Protocol (PDCP) layers. A gNB may comprise a CU and one DU connected to the CU via Fs-C and Fs-U interfaces for control plane (CP) and user plane (UP), respectively. A CU with multiple DUs will support multiple gNBs. The split architecture enables a 5G network to utilize different distribution of protocol stacks between CU 202 and DU 204 depending on mid-haul availability and network design. The CU 202 is a logical node that includes the gNB functions like transfer of user data, mobility control, RAN sharing, positioning, session management, etc., with the exception of functions that may be allocated exclusively to the DU 204. The CU 202 controls the operation of several DUs 204 over the mid-haul interface.

As mentioned above, 5G network functionality is split into two functional units: the DU 204, responsible for real time 5G layer 1 (L1) and 5G layer 2 (L2) scheduling functions, and the CU 202 responsible for non-real time, higher L2 and 5G layer 3 (L3). As shown in FIG. 2, the DU's server and relevant software may be hosted on a cell site 216 itself or can be hosted in an edge cloud (local data center (LDC) 218 or central office) depending on transport availability and fronthaul interface. The CU's server and relevant software may be hosted in a regional cloud data center or, as shown in FIG. 2, in a breakout edge data center (B-EDC) 214. As shown in FIG. 2, the DU 204 may be provisioned to communicate via a pass-through edge data center (P-EDC) 208. The P-EDC 208 may provide a direct circuit fiber connection from the DU directly to the primary cloud availability zone (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by a cloud computing service provider. According to various embodiments, the actual split between DU and RU may be different depending on the specific use-case and implementation.

FIG. 3 is a diagram showing connectivity between certain telecommunication network components with respect to a system (e.g., a system for SDAP and QoS based proactive scheduling for UL transmission grants). The central unit control plane (CU-CP) 302, for example, of CU 110 of FIG. 1 or CU 202 of FIG. 2, primarily manages control processing of DUs, such as DU 308, and UEs, such as UE 306. The CU-CP 302 hosts RRC and the control-plane part of the PDCP protocol. CU-CP 302 manages the mobility and radio resource control (RRC) state for all the UEs. The RRC is a layer within the 5G NR protocol stack and manages context and mobility for all UEs. The behavior and functions of RRC are governed by the current state of RRC. In 5G NR, RRC has three distinct states: RRC_IDLE, RRC_CONNECTED and RRC_INACTIVE. The CU-CP 302 terminates the E1 interface connected with the central unit user plane (CU-UP) 304 and the F1-C interface connected with the DU 308. The DU 308 maintains a constant heartbeat with CU-CP 302. The CU-UP 304 manages the data sessions for all UEs 306 and hosts the user plane part of the PDCP protocol. The CU-UP 304 terminates the E1 interface connected with the CU-CP and the F1-U interface connected with the DU 308.

A virtual private cloud is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channels) per user. In some embodiments, this 5G network leverages the distributed nature of 5G cloud-native network functions and cloud flexibility, which optimizes the placement of 5G network functions for optimal performance based on latency, throughput and processing requirements.

In some embodiments, the network architecture utilizes a logical hierarchical architecture consisting of National Data Centers (NDCs), Regional Data Centers (RDCs) and Breakout Edge Data Centers (BEDCs), to accommodate the distributed nature of 5G functions and the varying requirements for service layer integration. In one or more embodiments, BEDCs are deployed in Local Zones hosting 5G NFs that have strict latency budgets. They may also be connected with Passthrough Edge Data Centers (PEDC), which serve as an aggregation point for all Local Data Centers (LDCs) and cell sites in a particular market. BEDCs also provide internet peering for 5G data service.

In one or more embodiments, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone. These combined pieces provide a full RAN solution that handles all radio level control and subscriber data traffic.

In some embodiments, the User Plane Function (Data Network Name (DNN)) is collocated in the BEDC, which anchors user data sessions and routes to the internet. In another aspect, the BEDCs leverage local internet access available in Local Zones, which allows for a better user experience while optimizing network traffic utilization.

In one or more embodiments, the Regional Data Centers (RDCs) are hosted in the Region across multiple availability zones. The RDCs host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, multiple RDCs are deployed in a region, each in a separate Availability Zone (AZ) to ensure application resiliency and high availability.

In another aspect of some embodiments, an AZ is one or more discrete data centers with redundant power, networking, and connectivity in a Region. In some embodiments, AZs in a Region are interconnected with high-bandwidth and low-latency networking over a fully redundant, dedicated metro fiber, which provides high-throughput, low-latency networking between AZs.

Cloud Native Functions (CNFs) deployed in the RDC utilize a high-speed backbone to failover between AZs for application resiliency. CNFs like AMF and SMF, which are deployed in RDC, continue to be accessible from the BEDC in the Local Zone in case of an AZ failure. They serve as the backup CNF in the neighboring AZ and would take over and service the requests from the BEDC.

In this embodiment of the system for SDAP and QoS based proactive scheduling for UL transmission grants, dedicated VPCs are implemented for each Data Center type (e.g., local data center, breakout edge data center, regional data center, national data center, and the like). In some such embodiments, the national data center VPC stretches across multiple Availability Zones (AZs). In another aspect of some embodiments, two or more AZs are implemented per region of the cloud computing service provider.

Some embodiments of the 5G Core network functions require support for advanced routing capabilities inside VPC and across VPCs (e.g., UPF, SMF and ePDG). These functions rely on routing protocols such as BGP for route exchange and fast failover (both stateful and stateless). To support these requirements, virtual routers are deployed on EC2 to provide connectivity within and across VPCs, as well as back to the on-prem network.

Figure 4:
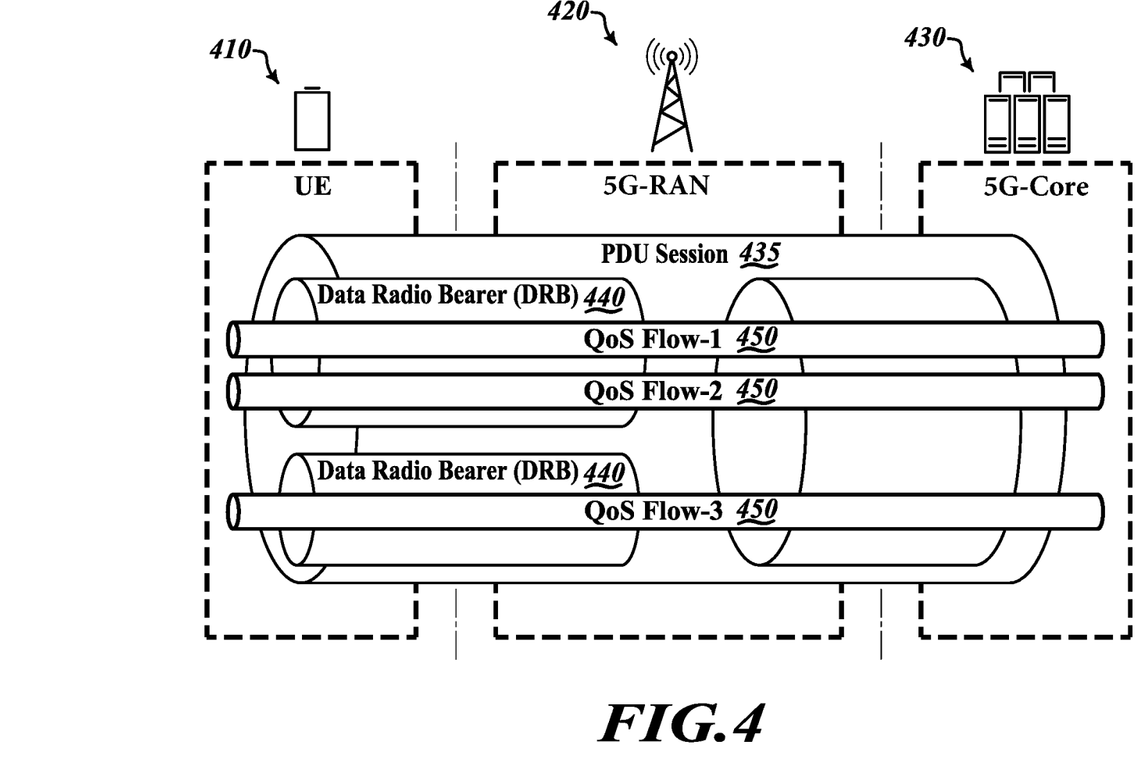
FIG. 4 illustrates a diagram showing 5G QoS architecture in which a 5G-RAN is connected to a 5G Core and the UEs, and where multiple DRBs are configured for QoS Flows within a PDU Session.

Referring now to FIG. 4, some embodiments of a 5G network architecture, such as described about in FIGS. 1-3, include a system for Service Data Adaptation Protocol (SDAP) and Quality of Service (QOS) based proactive scheduling for UpLink (UL) transmission grants. Quality of service (QOS) is a measurement of the overall performance of a service that is experienced by the users of the network, such as the 5G network described herein. Quality of service measures parameters such as QoS packet loss, bit rate, interrupts, latency, availability, signal-to-noise ratio, echo, and the like. Additionally, Quality of Service is a control mechanism that provides different priority to different applications, users, or operations, to guarantee a certain level of performance to a data flow.

In standard 5G architecture, QoS is enforced at the QoS flow level, which is the lowest level granularity within the 5G system. The QoS flow level is where policy and charging are enforced. Specifically, each QoS flow packet is marked using QoS flow identifier (QFI). In 5G architecture, the QoS flows are mapped in the Access Network to DRBs (Data Radio Bearers). This is in contrast to 4G systems, where the mapping is one-to-one between EPC and Radio Bearers. 5G QoS architecture supports various QoS flow types, including GBR QoS flow, Non-GBR QoS flow, and Delay Critical QoS flow. Guaranteed Bit Rate (GBR) QoS flow requires a guaranteed flow bit rate, while Non-Guaranteed Bit Rate (Non-GBR) QoS flow does not require guaranteed flow bit rate.

FIG. 4 shows the 5G QoS architecture in which the 5G-RAN 420 is connected to 5G Core 430 and the UEs 410. In FIG. 4, it is shown that the 5G Core 430 establishes one or more PDU Sessions 435 for each UEs 410. The 5G-RAN 420 establishes at least one Data Radio Bearers (DRB) 440 together with the PDU Session 435. Additional DRBs 440 can be subsequently configured for each UE 410 for QoS Flows 450 of that PDU Session 435. In some embodiments, the 5G-RAN 420 maps packets belonging to different PDU Sessions 435 to different DRBs 440. Furthermore, the UEs 410 and the 5G Core 430 include packet filters that associate UL packets and DL packets with QoS Flows 450. Additionally, the UEs 410 and the 5G-RAN 420 include mapping rules that associate UL QoS Flows and DL QoS Flows with the DRBs 440.

The 5G Network can provide the UE 410 with one or more QoS Flow 450 descriptions associated with a PDU Session 435 during the PDU session establishment. Each QoS Flow 450 contains a 5G QoS flow identifier (QFI) as well as other QoS flow information. 5G QoS characteristics dictate the packet forwarding treatment that a QoS Flow 450 receives edge-to-edge between the UE and the UPF in terms of various performance characteristics. In the 5G Core 430, there is only a single user plane network function for transport of data between the gNB 420 and the 5G Core 430. Accordingly, the gNB 420 may map individual QoS Flows 450 to one more DRBs 440. In some embodiments, the PDU Session 435 may contain multiple QoS Flows 450 and several DRBs 440. Additionally, in some embodiments, the DRB 440 may transport one or more QoS flows.

Figure 5:
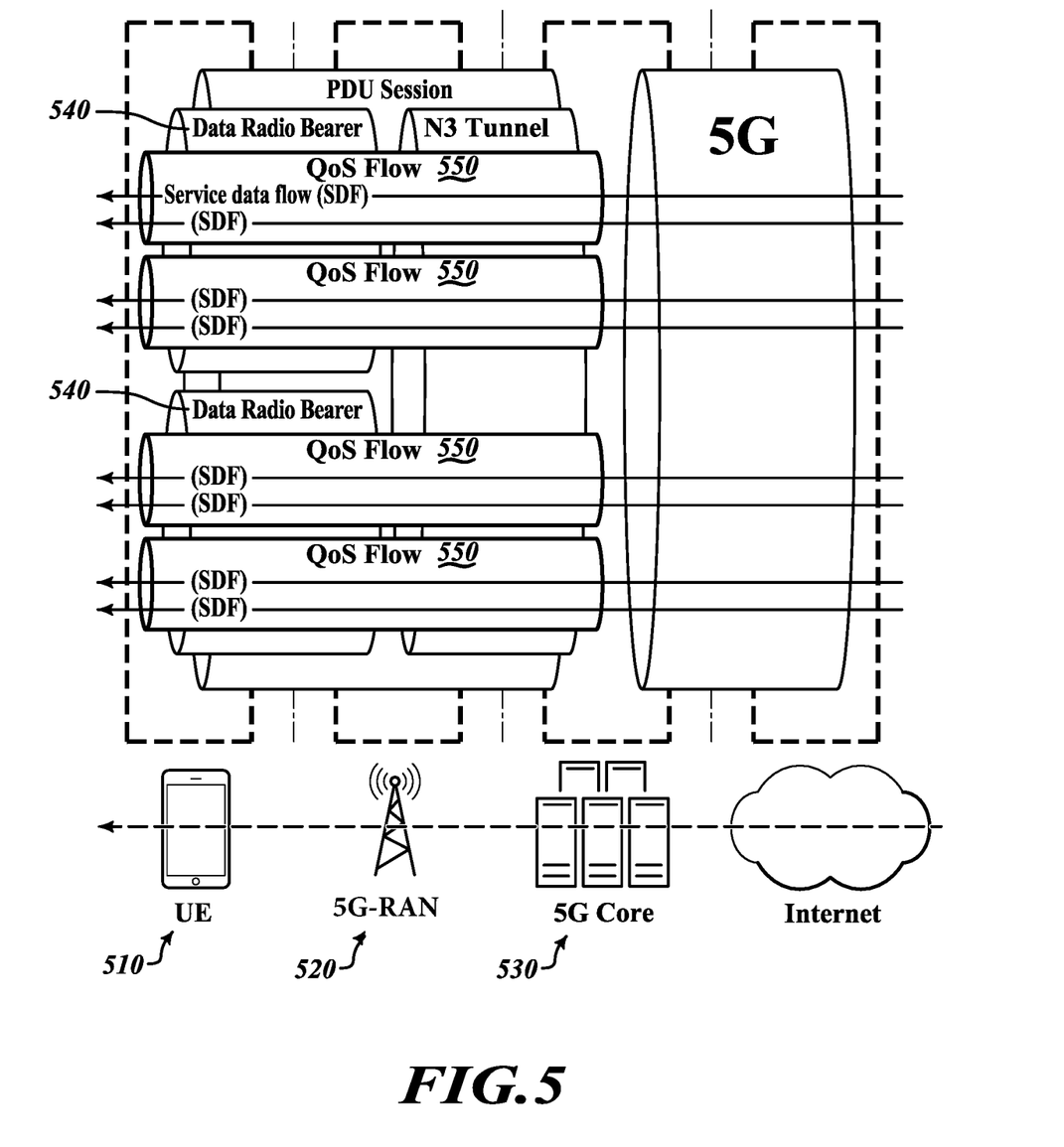
FIG. 5 illustrates a diagram showing 5G QoS architecture in which UEs are connected to a 5G-RAN to a 5G Core and to the Internet, and where multiple DRBs are configured for QoS Flows within a PDU Session.

Referring now to FIG. 5, a scheduling system is shown for SDAP and QoS based proactive scheduling for UL transmission grants. This scheduling system may be implemented a 5G architecture, such as has been shown in FIGS. 1-3 as described above. The scheduling system uses the gNB 520 to determine which UEs 510 (i.e., user devices) are in an idle mode and which UEs 510 are in a connected mode. In this configuration, the gNB 520 acts as a scheduler. The scheduling system also uses SDAP layers to map the QoS flow 550 to Data Radio Bearers (DRBs) 540 from the gNB 520 for UEs 510 that are in the connected mode. In such embodiments, the QoS is enforced at the QoS flow level 550. In this regard, the QoS flow packets are classified and marked using a QoS flow identifier (QFI). Additionally, scheduling system uses the gNB 520 to target UEs 510 with a higher priority QFI for selection before UEs 510 with a lower priority QFI. Continuing, the scheduling system provides proactive grants of UL transmissions to the selected UEs 510 with a higher priority QFI. Furthermore, the scheduling system provides grants of UL transmissions to the UEs 510 with a lower priority QFI using dynamic scheduling, after the scheduling system provides proactive grants of UL transmissions to the selected UEs 510 with a higher priority QFI.

In another aspect of the Service Data Adaptation Protocol (SDAP) and QoS based proactive scheduling system, the system providing UL scheduling based on grant free UL transmission. While grant free UL transmission is generally viewed as advantageous so that a UE always has the ability to obtain a UL transmission grant for uploading data, since UEs often do not have any data to upload, this can result in running out of UL transmission grants. The present Service Data Adaptation Protocol (SDAP) and QoS based proactive scheduling system eliminates or at least minimizes this problem. In some embodiments of the UL transmission scheduling system, the grant free UL transmission is Radio Resource Control (RRC) based or Download Control Information (DCI) based.

In another aspect of some embodiments of the scheduling system, higher priority QFIs include QFI1, QFI2, and QFI3, and lower priority QFIs include anything less than QFI1, QFI2, and QFI3. In still another aspect of some embodiments of the scheduling system, higher priority QFIs include QFI1 and QFI2, and lower priority QFIs include anything less than QFI1 and QFI2. In yet another aspect of some embodiments of the scheduling system, higher priority QFIs include QFI1, and lower priority QFIs include anything less than QFI1.

Referring now to another aspect of some embodiments, the scheduling system prevents a shortage of Physical Downlink Control Channel (PDCCH) space before a shortage of Physical Uplink Shared Channel (PUSCH) space. In this manner, the scheduling system prevents grants of UL transmissions to idle UEs with nothing to send. Additionally, the scheduling system prevents or at least minimizes grants of UL transmissions to connected UEs with a lower priority QFI.

Figure 6:
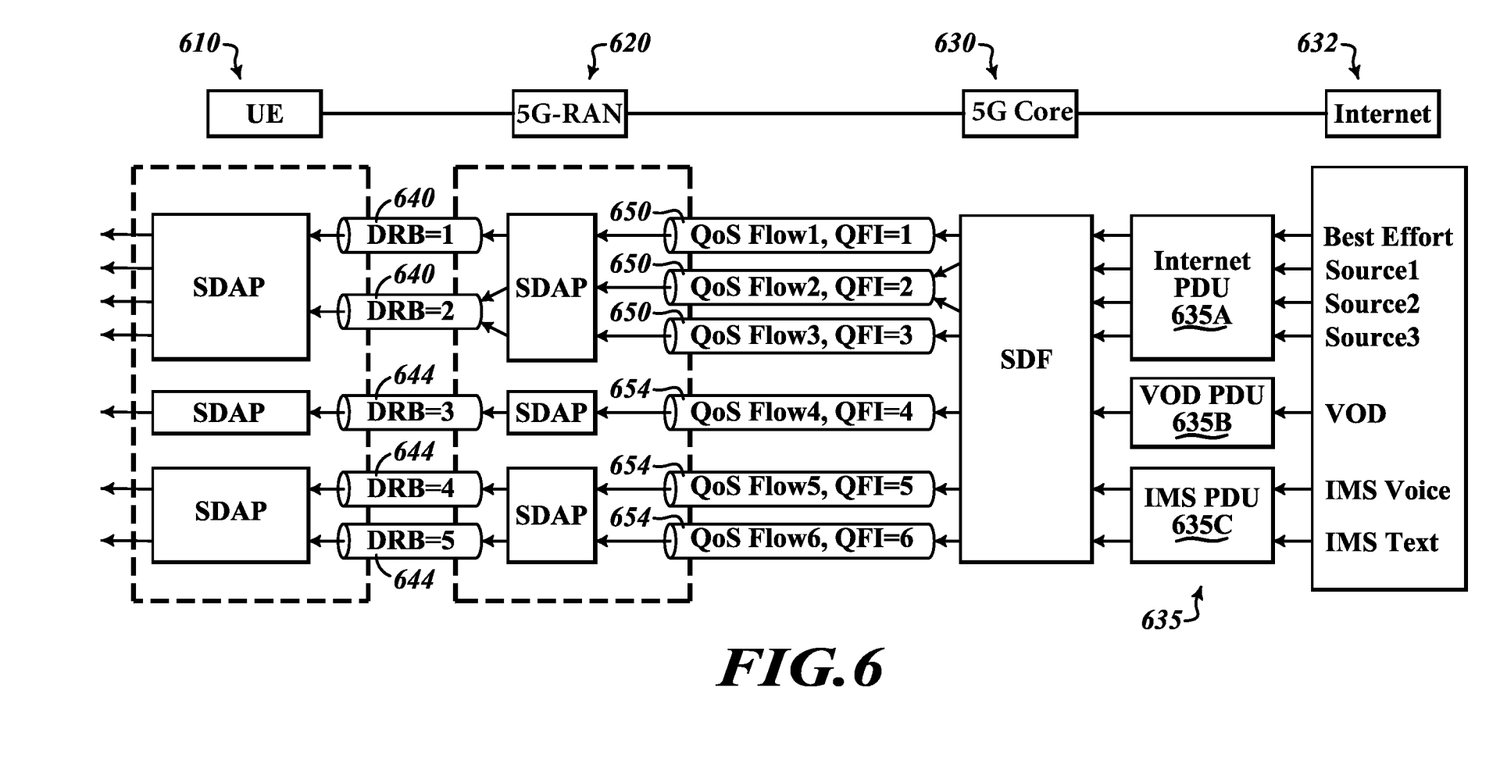
FIG. 6 illustrates a diagram showing 5G QoS architecture in which UEs are connected to a 5G-RAN to a 5G Core and to the Internet, and where multiple DRBs are configured for QoS Flows having various QFI priorities within a PDU Session.

Referring now to FIG. 6, an architecture of a SDAP and QoS based proactive scheduling system is shown. This proactive scheduling system may be implemented a 5G architecture, such as has been shown in FIGS. 1-3 as described above. In FIG. 6, a 5G QoS architecture is shown in which the UEs 610 are connected to the 5G-RAN 620, which is connected to 5G Core 630, which is connected to the Internet 632. Additionally, it is shown that one or more PDU sessions 635 are created (e.g., Internet PDU session 635A, Video on Demand session 635B, and IP Multimedia Subsystem session 635C). Furthermore, in the embodiment shown in FIG. 6, the 5G-RAN 620 establishes Data Radio Bearers (DRBs) 640 (e.g., DRB=1, DRB=2) and Data Radio Bearers (DRBs) 644 (e.g., DRB=3, DRB=4, DRB=5). Also, the 5G-RAN 620 establishes QoS Flows 650 (e.g., QoS Flow1 (QFI1), QoS Flow2 (QF2), and QoS Flow3 (QF3)) and QoS Flows 654 (e.g., QoS Flow4, QoS Flow5, and QoS Flow6).

In some embodiments, the 5G-RAN 620 maps packets belonging to different PDU sessions 635 to different DRBs. For example, Internet PDU session 635A may be mapped to DRB=1 and DRB=2; Video on Demand session 635B may be mapped to DRB=3; and IP Multimedia Subsystem session 635C may be mapped to DRB=4 and DRB=5. Additionally, in some embodiments, the 5G-RAN 620 maps packets belonging to different QoS Flows to different DRBs. For example, QoS Flow 1 may be mapped to DRB=1, QoS Flow2 and QoS Flow3 may be mapped to DRB=2, QoS Flow4 may be mapped to DRB=3, QoS Flow5 may be mapped to DRB=4, and QoS Flow6 may be mapped to DRB=5. Furthermore, in some embodiments, the UEs 610 and the 5G Core 630 include packet filters that associate UL packets and DL packets with QoS Flows. Additionally, the UEs 610 and the 5G-RAN 620 include mapping rules that associate UL QoS Flows and DL QoS Flows with the DRBs.

Figure 7:
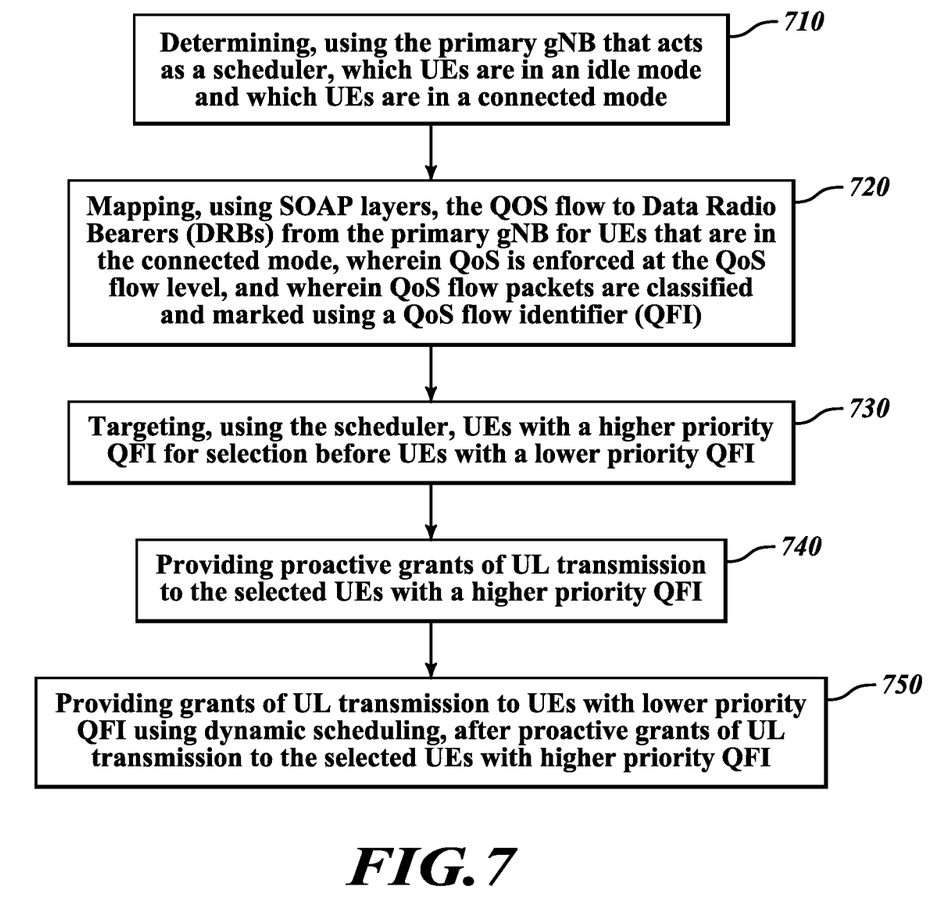
FIG. 7 is a logic diagram showing a method for Service Data Adaptation Protocol and Quality of Service based proactive scheduling for UL transmission grants.

FIG. 7 is a logic diagram showing a method for SDAP and QoS proactive scheduling for UL transmission grants. This schedule method may be implemented a 5G architecture, such as has been shown in FIGS. 1-3 as described above. As shown in FIG. 7, at operation 710, the method includes determining, using the primary gNB that acts as a scheduler, which UEs 610 are in an idle mode and which UEs 610 are in a connected mode. At operation 720, the method includes mapping, using SDAP layers, the QoS flow to Data Radio Bearers (DRBs) 640, 644 from the primary gNB for UEs 610 that are in the connected mode, wherein QoS is enforced at the QoS flow level, and wherein QoS flow packets are classified and marked using a QoS flow identifier (QFI). At operation 730, the method includes targeting, using the scheduler, UEs 610 with a higher priority QFI for selection before UEs 610 with a lower priority QFI. At operation 740, the method includes providing proactive grants of UL transmissions to the selected UEs 610 with a higher priority QFI. At operation 750, the method includes providing grants of UL transmissions to the UEs 610 with a lower priority QFI using dynamic scheduling, after the proactive grants of UL transmissions to the selected UEs 610 with a higher priority QFI.

Figure 8:
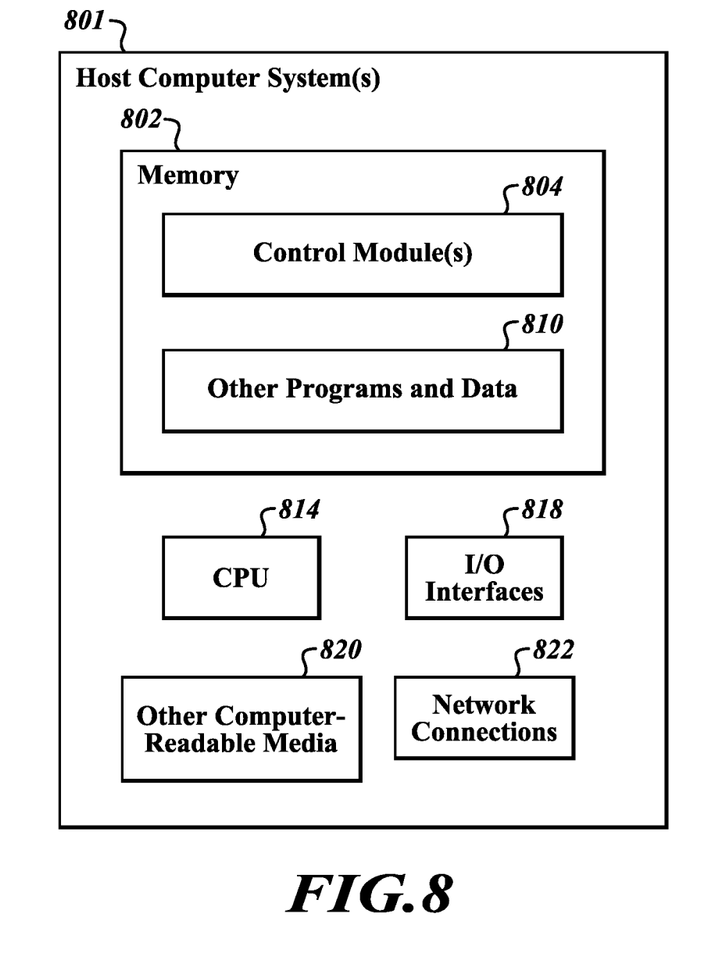
FIG. 8 shows a system diagram that describes an example implementation of a computing system(s) for implementing embodiments described herein.

FIG. 8 shows a system diagram that describes an example implementation of a computing system(s) for implementing embodiments described herein. The functionality described herein for a system for SDAP and QoS based proactive scheduling for UL transmission can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. This proactive scheduling system may be implemented a 5G architecture, such as has been shown in FIGS. 1-3 as described above.

In particular, shown is example host computer system(s) 801. For example, such computer system(s) 801 may represent those in various data centers and gNBs shown and/or described herein that host the functions, components, microservices and other aspects described herein to implement a method for SDAP and QoS based proactive scheduling for UL transmission grants. In some embodiments, one or more special-purpose computing systems may be used to implement the functionality described herein. Accordingly, various embodiments described herein may be implemented in software, hardware, firmware, or in some combination thereof. Host computer system(s) 801 may include memory 802, one or more central processing units (CPUs) 814, I/O interfaces 818, other computer-readable media 820, and network connections 822.

Memory 802 may include one or more various types of non-volatile and/or volatile storage technologies. Examples of memory 802 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 802 may be utilized to store information, including computer-readable instructions that are utilized by CPU 814 to perform actions, including those of embodiments described herein.

Memory 802 may have stored thereon control module(s) 804. The control module(s) 804 may be configured to implement and/or perform some or all of the functions of the systems, components and modules described herein for a method for SDAP and QoS based proactive scheduling for UL transmission grants. Memory 802 may also store other programs and data 810, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 822 are configured to communicate with other computing devices to facilitate the functionality described herein. In various embodiments, the network connections 822 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 818 may include a video interface, other data input or output interfaces, or the like. Other computer-readable media 820 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for Service Data Adaptation Protocol (SDAP) and Quality of Service (QOS) based proactive scheduling for UpLink (UL) transmission grants, the method comprising:
   providing, by a mobile network operator, a distributed unit (DU) of a fifth-generation (5G) cellular telecommunication network radio access network (RAN) that is served by a particular 5G cellular site base station, wherein the DU:
   is associated with a primary 5G Node B (gNB) identified by a primary identifier (ID); and
   is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID;
   determining, using the primary gNB that acts as a scheduler, which User Devices (UEs) are in an idle mode and which UEs are in a connected mode;
   mapping, using SDAP layers, QoS flow to Data Radio Bearers (DRBs) from the primary gNB for UEs that are in the connected mode,
   wherein QoS is enforced at a QoS flow level, and wherein QoS flow packets are classified and marked using a QoS flow identifier (QFI);
   targeting, using the scheduler, UEs with a higher priority QFI for selection before UEs with a lower priority QFI;
   providing proactive grants of UL transmissions to the selected UEs with a higher priority QFI; and
   providing grants of UL transmissions to the UEs with a lower priority QFI using dynamic scheduling, after the proactive grants of UL transmissions to the selected UEs with a higher priority QFI.

2. The method of claim 1, further comprising: providing UL scheduling based on grant free UL transmission.

3. The method of claim 2, wherein the grant free UL transmission is Radio Resource Control (RRC) based or Download Control Information (DCI) based.

4. The method of claim 1, wherein higher priority QFIs include QFI1, QFI2, and QFI3.

5. The method of claim 1, further comprising: preventing a shortage of PDCCH space before a shortage of PUSCH space by prioritizing the grant of UL transmissions to UEs that are in a connected mode before UEs that are in an idle mode.

6. The method of claim 1, further comprising: preventing grants of UL transmissions to idle UEs with nothing to send.

7. The method of claim 1, further comprising: minimizing grants of UL transmissions to connected UEs with a lower priority QFI.

8. A system for Service Data Adaptation Protocol (SDAP) and Quality of Service (QOS) based proactive scheduling for UpLink (UL) transmission grants, the system comprising:
   a memory that stores computer-executable instructions; and
   a processor that executes the computer-executable instructions and causes the processor to:
   determine, using a primary 5G Node B (gNB) that acts as a scheduler, which User Devices (UEs) are in an idle mode and which UEs are in a connected mode;

map, using SDAP layers, QoS flow to Data Radio Bearers (DRBs) from the primary gNB for UEs that are in the connected mode, wherein QoS is enforced at a QoS flow level, and wherein QoS flow packets are classified and marked using a QoS flow identifier (QFI);

target, using the scheduler, UEs with a higher priority QFI for selection before UEs with a lower priority QFI;

provide proactive grants of UL transmissions to the selected UEs with a higher priority QFI; and provide grants of UL transmissions to the UEs with a lower priority QFI using dynamic scheduling, after the proactive grants of UL transmissions to the selected UEs with a higher priority QFI.

9. The system of claim 8, wherein UL scheduling is provided based on grant free UL transmission.

10. The system of claim 9, wherein the grant free UL transmission is Radio Resource Control (RRC) based or Download Control Information (DCI) based.

11. The system of claim 9, wherein higher priority QFIs include QFI1, QFI2, and QFI3.

12. The system of claim 8, wherein the system prevents a shortage of PDCCH space before a shortage of PUSCH space by prioritizing the grant of UL transmissions to UEs that are in a connected mode before UEs that are in an idle mode.

13. The system of claim 8, wherein the grant of UL transmissions to idle UEs with nothing to send is prevented.

14. A non-transitory computer-readable storage medium having computer-executable instructions stored thereon that, when executed by a processor, cause the processor to:

determine, using a primary 5G Node B (gNB) that acts as a scheduler, which User Devices (UEs) are in an idle mode and which UEs are in a connected mode;

map, using Service Data Adaptation Protocol (SDAP) layers, Quality of Service (QOS) flow to Data Radio Bearers (DRBs) from the primary gNB for UEs that are in the connected mode, wherein QoS is enforced at a QoS flow level, and wherein QoS flow packets are classified and marked using a QoS flow identifier (QFI);

target, using the scheduler, UEs with a higher priority QFI for selection before UEs with a lower priority QFI;

provide proactive grants of UL transmissions to the selected UEs with a higher priority QFI; and provide grants of UL transmissions to the UEs with a lower priority QFI using dynamic scheduling, after the proactive grants of UL transmissions to the selected UEs with a higher priority QFI.

15. The non-transitory computer-readable storage medium of claim 14, wherein UL scheduling is provided based on grant free UL transmission.

16. The non-transitory computer-readable storage medium of claim 15, wherein the grant free UL transmission is Radio Resource Control (RRC) based or Download Control Information (DCI) based.

17. The non-transitory computer-readable storage medium of claim 15, wherein higher priority QFIs include QFI1, QFI2, and QFI3.

18. The non-transitory computer-readable storage medium of claim 14, wherein a shortage of PDCCH space before a shortage of PUSCH space is prevented by prioritizing the grant of UL transmissions to UEs that are in a connected mode before UEs that are in an idle mode.

19. The non-transitory computer-readable storage medium of claim 14, wherein the grant of UL transmissions to idle UEs with nothing to send is prevented.

20. The non-transitory computer-readable storage medium of claim 15, wherein proactive grants of UL transmissions to connected UEs with a lower priority QFI are minimized.

* * * * *